June 16, 1936. A. V. DAHLBERG 2,044,063
METHOD OF FERTILIZING TREES AND SHRUBS
Filed Feb. 3, 1936
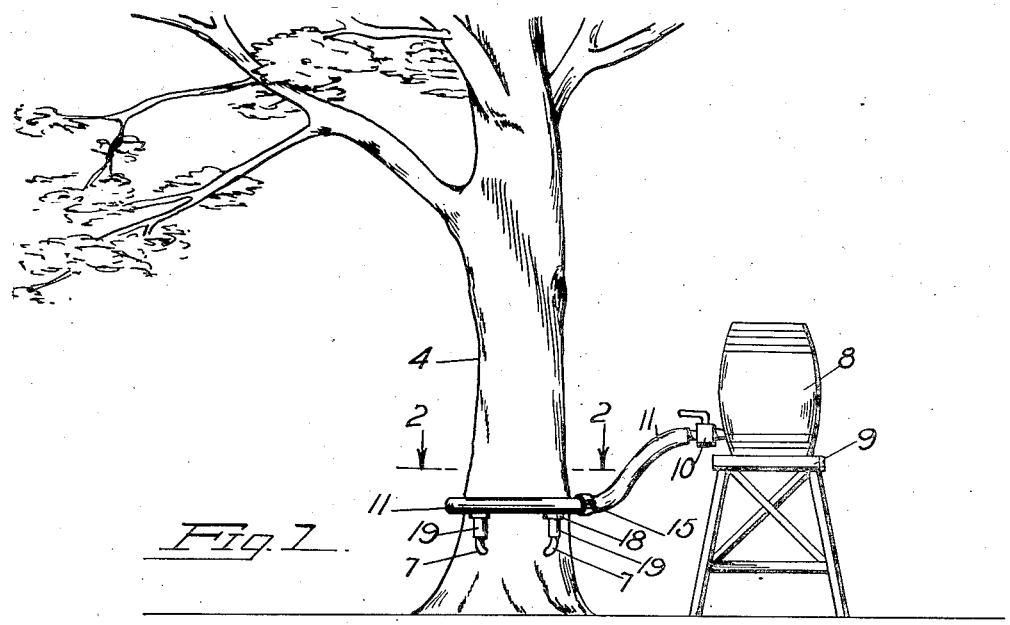
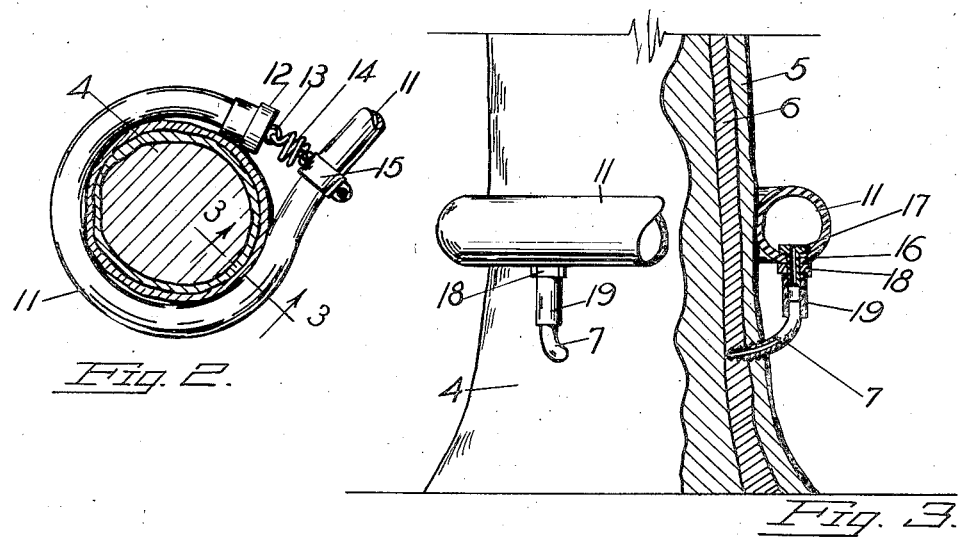
INVENTOR.
ARNOLD V. DAHLBERG
BY
ATTORNEY.

Patented June 16, 1936

2,044,063

UNITED STATES PATENT OFFICE 2,044,063

METHOD OF FERTILIZING TREES AND SHRUBS

Arnold V. Dahlberg, Denver, Colo.

Application February 3, 1936, Serial No. 62,177

5 Claims. (Cl. 47—58)

This invention relates to improvements in methods for fertilizing trees and shrubs.

It is common knowledge that all plant life requires certain foods in order to develop and grow properly, and to bear abundant fruit, and for this reason plant foods, generally referred to as fertilizers, are applied to the soil, and a portion of this reaches the plants for which it is intended.

Oranges, grapefruit, lemons, walnuts, almonds, etc., are grown principally under irrigation, in places where the rate of evaporation is high. Owing to the very large quantity of water evaporated, the salts in the water used for irrigation as well as that dissolved from the soil are brought to the surface zone and to the surface of the ground, with the result that the top soil becomes increasingly alkaline. In the orange districts of California, soil has been found with reactions as high as 8.5 pH according to the Sorensen scale.

When the soil reactions reach alkalinities of this range, it is sometimes found that the sap of the trees has turned alkaline. Tests conducted in connection with chlorosis in Elberta peaches in the Palisade district of Colorado and on Jonathan apples in the Twin Falls area of Idaho disclosed such an alkaline condition of the sap. When this stage of alkalinity is reached, many of the ordinary metals needed for fertilization become ineffective because they will no longer dissolve.

In tests conducted on peaches and apples it has been found that the manganese has been reduced to one-fourth of the amount found in normal trees. In these cases it was also found that there was a greatly increased amount of the more soluble elements such as nitrogen and potassium. The proportions of elements needed by the trees for their best growth, in the cases referred to, were wrong for the best results.

It is a fact well established and known to agronomists who have conducted fertilizer experiments with alkaline soils, especially soils that carry large amounts of the bicarbonates of calcium and magnesium, that phosphate fertilizers applied to such soils are rendered largely ineffective, due to the chemical reactions by which insoluble tricalcium phosphates are formed, that cannot be made use of by the trees.

From the above it will be apparent that when fertilizer is applied to the soil, to reach the trees through their root systems, it becomes a hit and miss proposition, due to soil factors over which we have very little, if any, control. By such a system the trees not only fail to obtain the various elements in the proportions required by them, but sometimes fail entirely to obtain important elements even when they are applied to the soil.

It is a conservative statement that under the method of fertilization now commonly employed in connection with fruit and nut trees and large shrubs, the trees and shrubs do not benefit from more than one-fourth to one-third of the fertilizer applied, which makes the cost of fertilizer very high.

It is the object of this invention to produce a method of fertilizing trees, shrubs and other plants in which the fertilizer, or plant food, will be fed directly to the trees by what may be termed an auxiliary or artificial root system, which makes it possible to control the chemical composition of the fertilizer introduced into the trees or plants and to obviate the objectionable chemical reactions through a correct acidity of the solution.

In order to properly practice this invention, analyses are first made of the sap from the most vigorous and productive trees of a certain variety growing on a certain soil. From these analyses is determined the approximate amounts of minerals, such as nitrogen, phosphorus, potassium, calcium, magnesium, silicon, sulphur, manganese, iron, zinc, copper, boron, chlorine etc., present in the sap under normal conditions. Analyses are also made of the fruit ash, to obtain a fair measure of the demand per season, for various elements required to support fruit growth. Similar analyses are also made to obtain the amount of minerals needed per season, for tree growth.

A solution is now made up, preferably in concentrated form, which contains the required elements in the right proportions. If the solutions are prepared in concentrated form, they are first diluted to a concentration that will maintain sap strength at the point corresponding to optimum conditions for growth and fruit production.

The degree of concentration which is the most desirable is finally determined by experimentation.

In making up the solution sufficient acid, such as citric, phosphoric, or other suitable acid, is added to give the best results. The quantity is calculated in accordance with the degree to which the solution is to be diluted. When dealing with trees growing in soil so highly alkaline that the reaction of the sap is nearly neutral, it is often desirable to increase the acidity of the solution to compensate.

After the solution has been prepared, as above described, it is introduced directly into the cambium, and for this purpose an apparatus is employed which has been illustrated in a general way, in the accompanying drawing, to which reference will now be had, and in which:—

Figure 1 is a side view of a tree showing a feeding apparatus attached to it, and connected with a vessel containing the solution;

Figure 2 is a section taken on line 2—2, Figure 1; and

Figure 3 is a view to a slightly larger scale than that used in Figure 1, showing the lower end of the tree, a portion being shown as a section taken on line 3—3, Figure 2.

In the drawing, reference numeral 4 designates the trunk of a tree. It is to be understood that a tree is employed merely as an example, as the method can be employed with shrubs and other vegetation.

Reference numeral 5 designates the bark, and reference numeral 6 the cambium. The fertilizer solution is introduced into the cambium layer through a plurality of hollow needles 7.

Holes of the proper size are first bored through the bark and into the cambium layer, and the needles 7, which are preferably provided with threads near their ends, are then screwed into the holes.

The solution is put into a keg 8 which is supported some distance above the ground on a support 9. The keg has a faucet 10 to which a rubber hose 11 is connected. The other end of the hose is provided with a closure cap 12, which carries an eye 13. A spring 14 is attached at one end to the hose by means of a clamp 15, and at the other end to the eye 13. The clamp 15 is so adjusted that the hose will fit snugly against the tree.

In Figure 3, the hose has been purposely shown as of a diameter much greater in proportion to the tree than is actually the case, the object of this exaggeration being to illustrate more clearly how the interior of the hose is connected with the hollow needles 7. Tubular stems 16 are inserted through holes in the wall of the hose, and are provided at their inner ends with heads 17. Nuts 18 hold the stems in place. Short sections of rubber tubing 19 connect the stems with the needles.

When the faucet 10 is opened, solution from the keg 8 can flow into the cambium layer 6 where it will be carried upwardly by the capillary action of the tree. The hydraulic head is adjusted to give the best results. It is understood, however, that it is not the object to force the fertilizer into the tree by pressure, except where necessary. The fertilizer solution is carried into and along the tree in the same manner as the sap.

The apparatus described is merely illustrative and can be constructed in other ways. The material employed must be such as not to be corroded or affected by the fertilizer solution. Rubber of the proper degree of hardness is a suitable material, and the hose 11 can be an ordinary garden hose or a rubber tube.

The apparatus described is in effect an auxiliary root system, through which the artificial sap is introduced to correct the deficiencies of the sap obtained from the ground or to furnish food for increased growth and fruit production. The solution in the kegs can be replenished from time to time as required.

When this system is employed, the trees depend on the natural root systems for water and for support only.

Nothing is done to the soil except to grow green crops so as to maintain it in the proper physical condition for good water movement. All of the fertility needed for growth and fruit can be fed through the auxiliary and controlled root system.

Trees are able to build up reserves of plant food for use for the production of fruit. By the system hereinbefore described, it is possible to assist the trees very effectively in building up reserves. It is also possible to reduce the amount of nitrogen in the solution when the ripening period approaches, so as to bring the fruit to a good maturity.

The method of fertilization described above not only reduces the cost of fertilization, but provides a means for controlling the quality of the fruits more effectively than by any method now used. The quantity or yield of fruits, nuts, etc., can also be greatly increased by this system.

It is to be understood that wherever the words "trees" or "fruit trees" or similar terms are employed, throughout the specification and claims, they include trees in general, as well as shrubs and other plants and vegetables in connection with which the method can be used.

Having described the invention, what is claimed as new is:—

1. The method of feeding fruit trees, which consists in introducing a nutrient solution into the cambium layer independently of the natural root system of the tree.

2. The method of promoting the growth of trees and increasing their productivity which consists in introducing into the cambium layer, independently of the roots of the trees, a nutrient solution containing the food elements necessary for growth and productivity.

3. The method of compensating for soil deficiency and producing normal growth and productivity, which consists in introducing into the cambium layer, independently of the root system, a solution containing the required minerals necessary to supplement those obtained from the soil.

4. The system of feeding fruit trees, and the like, which comprises inserting into the cambium layer, a tubular member whose outer end is in communication with a vessel containing a nutrient solution, the vessel being positioned at a level above the point where the tube communicates with the cambium layer, whereby the solution is urged to flow into the cambium layer by the action of the hydrostatic head.

5. The method of increasing the growth and productivity of fruit trees and the like, which consists in determining by analyses of the sap and fruit of vigorous trees the composition of the sap and the quantity of various plant foods required for normal growth and production, applying similar analyses to the sap and fruit of trees deficient in growth and production, determining from these analyses the deficiencies in the plant food normally obtained from the soil, and introducing into the cambium layer, independently of the root system, a solution containing the plant foods lacking in the sap obtained through the root system.

ARNOLD V. DAHLBERG.